United States Patent
Zhou et al.

(10) Patent No.: US 11,279,124 B2
(45) Date of Patent: Mar. 22, 2022

(54) SYSTEM AND CONTROL METHOD FOR EMBOSSED-IN-REGISTER OF SHEET

(71) Applicant: QINGDAO SANYI PLASTIC MACHINERY CO., LTD. (CN), Qingdao (CN)

(72) Inventors: Yuliang Zhou, Qingdao (CN); Chenggong Liu, Qingdao (CN)

(73) Assignee: QINGDAO SANYI PLASTIC MACHINERY CO., LTD. (CN), Qingdao (CN)

( * ) Notice: Subject to any disclaimer, the term of this patent is extended or adjusted under 35 U.S.C. 154(b) by 0 days.

(21) Appl. No.: 17/241,789

(22) Filed: Apr. 27, 2021

(65) Prior Publication Data

US 2022/0032603 A1 Feb. 3, 2022

(30) Foreign Application Priority Data

Jul. 31, 2020 (CN) .......................... 202010757165.9

(51) Int. Cl.
*B41F 15/14* (2006.01)
*B41F 33/00* (2006.01)

(52) U.S. Cl.
CPC .......... *B41F 15/14* (2013.01); *B41F 33/0081* (2013.01)

(58) Field of Classification Search
CPC ............................. B41F 15/14; B41F 33/0081
See application file for complete search history.

(56) References Cited

U.S. PATENT DOCUMENTS 4,312,686 A * 1/1982 Smith .................... B29C 43/305
156/209
4,781,317 A * 11/1988 Ditto ........................ B26D 5/30
226/27

(Continued)

FOREIGN PATENT DOCUMENTS

| CN | 207415828 U | 5/2018 |
| CN | 109940867 B | 6/2019 |
| EP | 2974881 A1 | 1/2016 |

OTHER PUBLICATIONS

Search Report of the parallel application, OPRI.

*Primary Examiner* — David H Banh
(74) *Attorney, Agent, or Firm* — J.C. Patents (57) ABSTRACT

A system and control method for embossed-in-register of a sheet is provided. The system comprises a printed film winding/releasing mechanism, a film laminating roller and a pattern roller, wherein the printed film is provided with first identifiers at intervals; the system further comprises: a camera configured to acquire an image of the printed film, an encoder configured to detect a rotation position of the pattern roller, and a control system; the control system comprises a storage unit, a data acquisition unit and a control unit; wherein, the control unit is configured to identify a position of an identifier based on the image of the printed film, identify a rotation position of the pattern roller based on information fed back by the encoder and generate a rotation control signal of the pattern roller based on a difference of position information of the identifier and position information of the pattern roller so as to adjust a rotation speed of the pattern roller. By using the EIR solution provided by the present application, the printed film is not required to be widened, and an existing structure and effective area of the printed film are effectively used, so that the universality of the printed film is improved, the outturn (Continued)

percentage may be guaranteed, and the production cost cay be reduced.

7 Claims, 4 Drawing Sheets

(56) References Cited

U.S. PATENT DOCUMENTS

| | | | | |
|---|---|---|---|---|
| 6,928,929 | B1* | 8/2005 | McNeil | B26D 5/32 |
| | | | | 101/226 |
| 8,316,764 | B1 | 11/2012 | Wu | |
| 2003/0105443 | A1* | 6/2003 | Ohnishi | A61F 13/15772 |
| | | | | 604/370 |
| 2012/0234192 | A1* | 9/2012 | Schnabel | B41F 33/14 |
| | | | | 101/481 |
| 2015/0090140 | A1* | 4/2015 | Rancourt | B41F 7/04 |
| | | | | 101/219 |

* cited by examiner

SYSTEM AND CONTROL METHOD FOR EMBOSSED-IN-REGISTER OF SHEET

The present application claims priority to the Chinese Patent Application No. 202010757165.9, filed on Jul. 31, 2020 and entitled "SYSTEM AND CONTROL METHOD FOR EMBOSSED-IN-REGISTER OF SHEET", the entire contents of which are incorporated herein by reference.

TECHNICAL FIELD

The present application relates to the technical field of sheet processing and in particular to a system and control method for embossed-in-register of a sheet.

BACKGROUND

Different colors of a sheet are achieved by laminating different color films. In order to enhance a sense of reality, the sheet may also be printed and embossed by a pattern roller. Patterns of the pattern roller correspond to patterns of the color film. To improve beauty of the sheet, patterns of the color film laminated onto the surface of the sheet are required to be superimposed with embossing textures, that is, an embossed-in-register (EIR) technology.

Sheet processing in the prior art is realized by adopting the following solution.

A base material of a plastic floor is produced by an extrusion line or internal mixer, next, the color films are artificially placed one by one, then, hot pressing lamination is performed by using a pressing machine, and therefore, the sheet processing is low in production efficiency, high in energy consumption and low in finished product rate.

As an improvement of the above-mentioned sheet processing method, the synchronous printing and film laminating technology is capable of realizing online synchronous embossing by virtue of an extruder and has the advantages that a synchronously embossed plastic floor may be produced on line, the production efficiency is effectively increased, and the energy consumption is reduced. However, this technology depends on specially customized color films, marks conveniently identified by a sensor is required to be additionally printed on a region except an effective printing surface of the color film, the mark is required to be formed by forming a rectangular strip with the width of about 2 mm and the length of about 20 mm on one side of the color film and forming an independent rectangular strip on the other side, and other marks are not allowed to appear within a longitudinal range of the marks. Moreover, the marks are required to be printed in an independent space, so that a base material of the color film is required to be widened, equipment and rollers for printing are required to be customized, furthermore, the production flexibility is limited, the overall outturn percentage is reduced, the cost of the color film is increased, and it is possible that absent identifying of the marks is caused and may not be found in time.

SUMMARY

A purpose of the present application is to improve the above-mentioned technical problem and provide a sheet processing technology.

In order to achieve the above-mentioned purposes, a system for EIR of a sheet is provided in some embodiments of the present application. The system comprises a printed film winding/releasing mechanism for winding/releasing a printed film, a film laminating roller for assistance in lamination of the printed film and a pattern roller spaced from the film laminating roller, wherein the printed film is periodically provided with identifiers at intervals on positions corresponding to pattern positions of the printed film; the system further comprises:

a camera, disposed on a release path of the printed film and configured to acquire an image of the printed film;

an encoder, disposed on the pattern roller and configured to detect a rotation position of the pattern roller; and a control system comprising:

a storage unit, configured to store corresponding information of the identifiers and the pattern positions of the printed film as well as pattern information at a periphery of the pattern roller;

a data acquisition unit, configured to acquire an image signal, acquired by the camera, of the printed film and a position signal, detected by the encoder, of the pattern roller; and a control unit, configured to acquire data from the data acquisition unit, identify a position of an identifier based on the image of the printed film, identify the rotation position of the pattern roller based on information fed back by the encoder and generate a rotation control signal of the pattern roller based on a difference of position information of the identifier and position information of the pattern roller at the same moment so as to adjust a rotation speed of the pattern roller.

In some embodiments of the present application, the identifiers at least comprise a first identifier and a second identifier, the first identifier regularly corresponds to a first pattern position of the printed film, and the second identifier regularly corresponds to a second pattern position of the printed film.

In some embodiments of the present application, the control unit is further configured to generate a displacement change tendency signal based on a comparison result of a pattern position, corresponding to the first identifier, of the printed film and a pattern position of the pattern roller at a first moment and a comparison result of a pattern position, corresponding to the second identifier, of the printed film and a pattern position of the pattern roller at a second moment, and adjust and generate rotation control signal of the pattern roller based on the change tendency signal.

In some embodiments of the present application, the storage unit is further configured to define a coordinate position of the first identifier and store the coordinate position information of the first identifier, set position information of a second coordinate based on a distance from the first identifier to the second identifier and store a coordinate position of the second identifier; and the control unit is further configured to identify the identifier based on the image, acquired by the camera, of the printed film, and call coordinate information corresponding to the identifier to acquire position information of the printed film.

In some embodiments of the present application, a circumference of the pattern roller is 104%-115% of a circumference of a printing stencil; and the circumference of the printing stencil is a length corresponding to a repetition period of patterns of the printed film.

In some embodiments of the present application, the identifiers are originally presented on the printed film and are not post-processed for EIR, and the identifiers comprise, but not limited to a cutting line mark, a center-of-circle mark, a direction mark and a color card mark.

In some embodiments of the present application, the system further comprises a deviation correcting device disposed on the release path of the printed film.

In some other embodiments of the present application, a control method for EIR is provided, in which the above-mentioned system for EIR is utilized; the control method comprises:

periodically disposing identifiers on a printed film;

storing corresponding information of the identifiers and pattern positions of the printed film as well as pattern information at a periphery of a pattern roller;

detecting a real-time position of an identifier and a real-time position of the pattern roller, and calculating a difference of position information of the identifier and position information of the pattern roller 2 at the same moment; and adjusting a rotating speed of the pattern roller to reduce the difference of the position information.

In some embodiments of the present application, in the control method, the identifiers at least comprise a first identifier and a second identifier, the first identifier regularly corresponds to a first pattern position of the printed film, and the second identifier regularly corresponds to a second pattern position of the printed film; the control method further comprises:

acquiring a first deviation value based on a real-time position of the first identifier and a real-time position of the pattern roller;

acquiring a second deviation value based on a real-time position of the second identifier and a real-time position of the pattern roller;

comparing the second deviation value with the first deviation value to acquire a synchronous adjustment tendency; and judging whether an adjustment solution is reasonable based on the synchronous adjustment tendency, and adjusting a rotating speed of the pattern roller.

In some embodiments of the present application, the control method further comprises:

if the second deviation value is smaller than the first deviation value, further adopting the current adjustment solution, or adjusting a control signal for the pattern roller to change the deviation from rapid reduction to relatively slow reduction, so as to avoid over-adjustment; and if the second deviation value is greater than the first deviation value, proving that over-adjustment has happened at present, and adopting an opposite control signal for adjustment.

In some embodiments of the present application, the control method comprises:

defining coordinates of the first identifier, and setting coordinates of the second identifier based on the coordinates of the first identifier;

after identifying an identifier, calling the coordinates of the identifier; and confirming a position of the identifier based on the coordinates of the identifier.

Compared with a similar product in the prior art, the system and control method for EIR, provided by the present application, have the beneficial effects:

(1) according to the system and control method for EIR, provided by the present application, control on EIR may be performed on line, and a control solution may be adjusted according to data detected in real time to improve the EIR precision, so that the sheet achieves a better beautiful effect;

(2) according to the system and control method for EIR, provided by the present application, the printed film is not required to be widened or additionally printed with the identifiers, and various graphic information owned by the printed film itself is used as the identifiers, so that the universality of the printed film is improved, the outturn percentage may be guaranteed, and the production cost may be reduced; and (3) according to the system and control method for EIR, provided by the present application, by selecting the first identifier and the second identifier on different positions of the printed film, the deviations of the pattern positions of the printed film and the pattern positions of the pattern roller at different moments may be calculated to acquire the synchronous adjustment tendency, whether the adjustment solution is reasonable is judged, and the control signal is adjusted in real time, so that the control precision is further improved.

BRIEF DESCRIPTION OF THE DRAWINGS

FIG. 6 is a second flow diagram of a control method for EIR, provided by an embodiment of the present application; wherein:

1—film laminating roller; 2—pattern roller; 3—first calendering roller; 4—second calendering roller; 5—printed film winding/releasing mechanism; 6—wear-resistant film winding/releasing mechanism; 7—printed film; 701—cutting line mark; 702—center-of-circle mark; 703—direction mark; 704—color card mark; 705—enterprise logo; 8—camera; 9—deviation correcting device; 10—blank; 11—encoder; 12—control system; 121—storage unit; 122—data acquisition unit; and 123—control unit.

DETAILED DESCRIPTION

In order to make technical problems to be solved, technical solutions and beneficial effects of the present application clearer, the present application will be further described in detail below in conjunction with the accompanying drawings and embodiments. It should be understood that specific embodiments described herein are merely intended to explain the present application, rather than to limit the present application.

It should be noted that when an element is referred to as being "disposed on" another element, it can be directly or indirectly on another element. When an element is referred to as being "connected to" another element, it can be directly or indirectly connected to another element.

Terms "first", "second", "third" and "fourth" are merely for the purpose of description, but are not used for indicating the relative importance.

The "sheet" in the present application particularly refers to a floor.

The technical solutions provided by the present application are used for sheet processing and are specifically used for enabling embossing textures to correspond to film laminating patterns (they are superimposed as much as possible) during sheet processing, so that a better visual effect is achieved.

Figure 1:
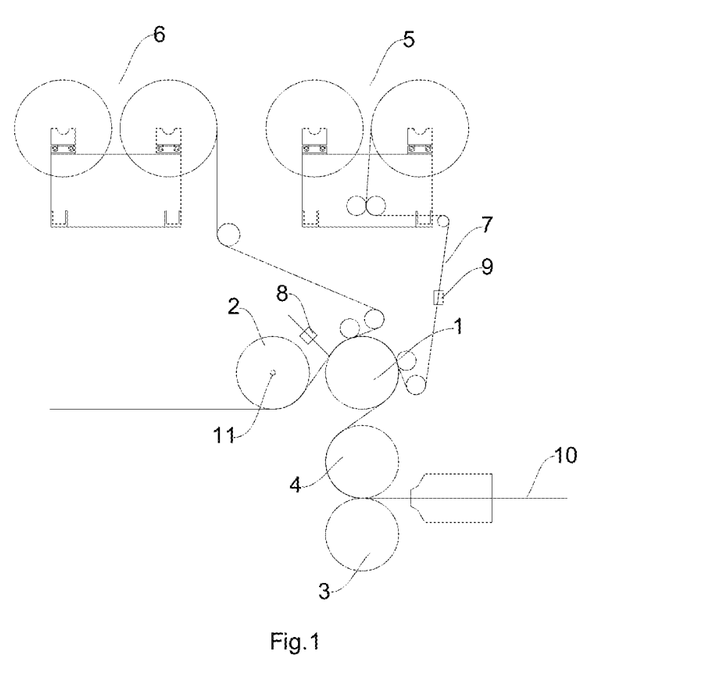
FIG. 1 is a schematic diagram showing a structure of a system for EIR, provided by an embodiment of the present application.

A calender and assemblies used during sheet processing comprise the following structures as shown in FIG. 1.

A front end mechanism comprises an extruder, a mould and the like and is configured to extrude a blank 10 of the sheet and preliminarily shaping the blank 10. The front end mechanism is not shown in FIG. 1.

A calender may be provided with a plurality of sets of calendering rollers according to a processing demand, and the discharging end of the mould is located at a feeding end of a first set of calendering rollers. The blank 10 is calendered and modified by the calendering rollers. In the present embodiment, as shown in FIG. 1, the calender comprises a first calendering roller 3, a second calendering roller 4, a third calendering roller and a fourth calendering roller according to a sheet processing direction. The blank 10 enters the calender through a gap located between the first calendering roller 3 and the second calendering roller 4. The third calendering roller is a film laminating roller 1, and the fourth calendering roller is a pattern roller 2, wherein the film laminating roller 1 is configured to laminate a film on a surface of the blank 10, and the pattern roller 2 is configured to emboss the film laminated surface.

A film laminating mechanism generally comprises a printed film winding/releasing mechanism 5 and a wear-resistant film winding/releasing mechanism 6. The printed film winding/releasing mechanism 5 is configured to wind/release a printed film 7, and the printed film 7 is guided to a front end of the film laminating roller 1 and is laminated on the blank 10. The wear-resistant film winding/releasing mechanism 6 is configured to wind/release a wear-resistant film, and the wear-resistant film is laminated on the printed film 7 to improve the wear-resistant effect of the sheet. In some embodiments, the wear-resistant film may be omitted as required, and accordingly, the wear-resistant film winding/releasing mechanism 6 may also be omitted.

Patterns of the printed film 7 correspond to (same with) patterns of the pattern roller 2. During sheet processing, the printed film 7 and the pattern roller 2 may be replaced according to different pattern demands. The patterns on the printed film 7 are periodically and repeatedly disposed, and a pattern period of the printed film 7 corresponds to the patterns at a periphery of the pattern roller 2.

In order to improve the beautiful effect, the patterns of the printed film 7 laminated on the blank 10 are required to be superimposed as much as possible with textures embossed on a surface of the printed film by the pattern roller 2. For this purpose, a system for EIR of the sheet, provided by an embodiment of the present application, comprises the printed film winding/releasing mechanism 5 for winding/releasing the printed film 7, the film laminating roller 1 for assistance in lamination of the printed film 7 and the pattern roller 2 spaced from the film laminating roller 1; and the printed film 7 is periodically provided with identifiers at intervals on positions corresponding to pattern positions of the printed film 7.

Figure 2:
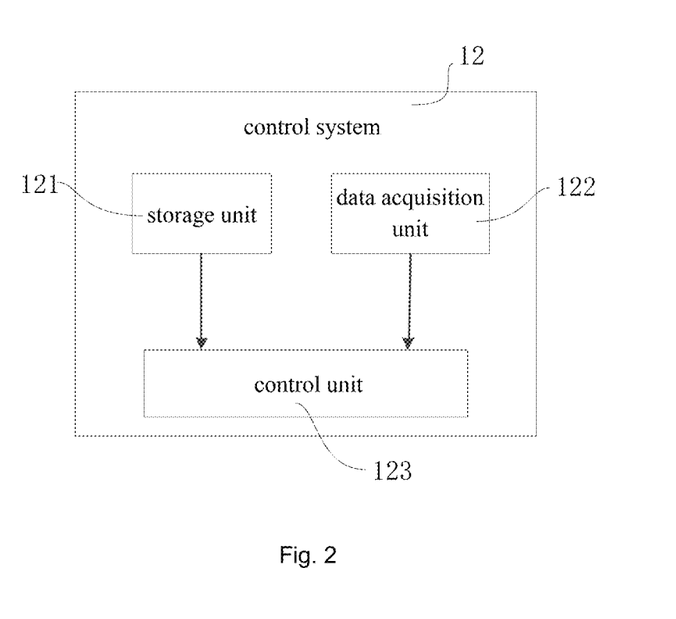
FIG. 2 is a schematic diagram of a control system in the system for EIR, provided by the embodiment of the present application.

As shown in FIG. 1, the system further comprises:

a camera 8, disposed on a release path of the printed film 7 and between the film laminating roller 1 and the pattern roller 2 and configured to acquire an image of the printed film 7;

wherein the image of the printed film 7 comprises identifier information, the image of the printed film 7 is further used for assistance in detection of the identifiers on the printed film 7 in subsequent technical solutions, and the printed film 7 is positioned under assistance of the identifiers;

an encoder 11, disposed on the pattern roller 2 and configured to detect a rotation position of the pattern roller 2; and a control system 12 (as shown in FIG. 2) comprising:

a storage unit 121, configured to store corresponding information of the identifiers and the pattern positions of the printed film 7 as well as pattern information at a periphery of the pattern roller 2;

if a starting point of a pattern period is defined as a zero point, information stored by the storage unit 121 comprises, but not limited to: the patterns (the identifiers) of the printed film 7 and position information (such as distances from the patterns to the zero point) corresponding to the patterns of the printed film 7 and the patterns at the periphery of the pattern roller 2 and position information (such as an angle or arc length between each of the pattern positions to the zero point) corresponding to the patterns of the pattern roller 2;

a data acquisition unit 122, configured to acquire an image signal, acquired by the camera 8, of the printed film and a position signal, detected by the encoder 11, of the pattern roller 2; wherein the above-mentioned signals are further transmitted to a control unit 123; and the control unit 123, configured to acquire data from the data acquisition unit 122, identify a position of an identifier based on the image signal of the printed film, identify the rotation position of the pattern roller 2 based on information fed back by the encoder 11 and generate a rotation control signal of the pattern roller 2 based on a difference of position information of the identifier and position information of the pattern roller 2 at the same moment so as to adjust a rotation speed of the pattern roller 2.

It can be understood that the patterns of the printed film 7 correspond to the patterns of the pattern roller 2, and therefore, the position information of the pattern roller 2 specifically refers to a position of the pattern, corresponding to the identifier identified at the moment, on the pattern roller 2.

By using the system for EIR, provided by the above-mentioned embodiment, the patterns of the printed film may be superimposed with embossing textures as much as possible in film laminating and embossing processes, so that an EIR effect is guaranteed, the outturn percentage is increased, and the production cost is reduced.

Figure 3:
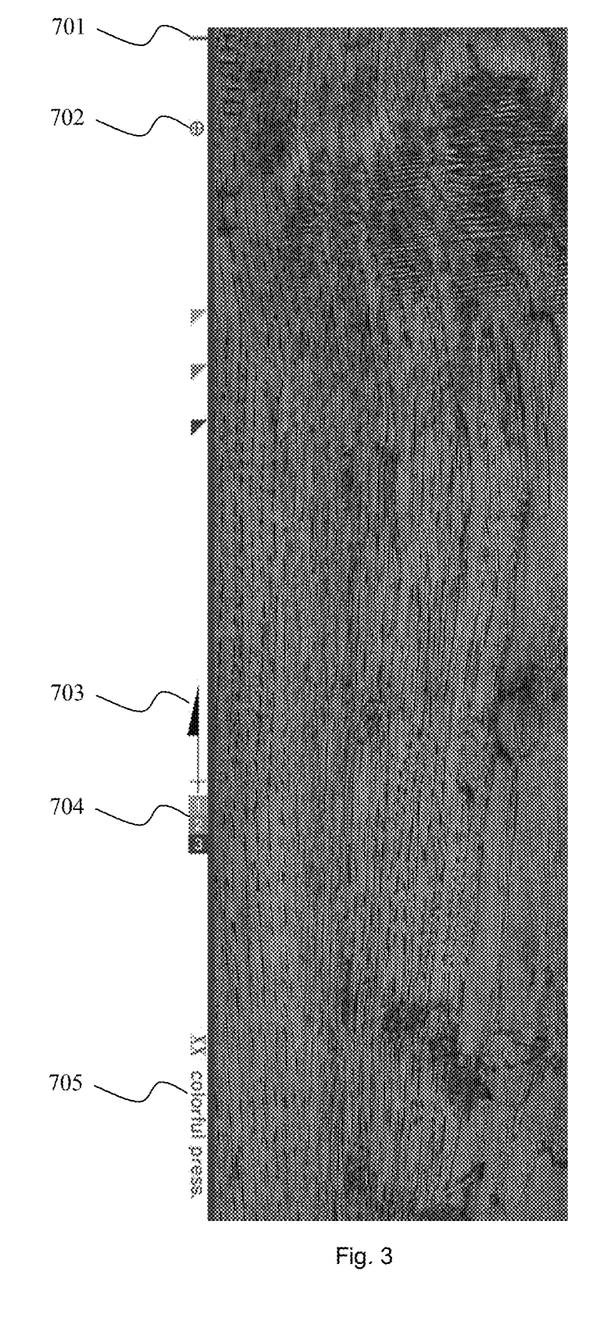
FIG. 3 is an enlarged view showing an edge of a pattern of a printed film.

The above description that "the printed film 7 is periodically provided with identifiers at intervals on positions corresponding to pattern positions of the printed film" means that the identifiers are originally presented on the printed film 7, but are not specially processed for EIR. FIG. 3 is an enlarged view showing an edge of a pattern of a printed film within a pattern period, for example, the identifiers may be graphic information such as a cutting line mark 701, a cross-shaped center-of-circle mark 702, an arrow direction mark 703, a color card mark 704 and an enterprise logo 705, and these identifiers are fixly processed on the printed film 7 in order to facilitate processing. Generally, these marks periodically exist, which means that corresponding identifiers are disposed within each pattern period of the printed film 7, and the identifiers are periodically disposed on positions corresponding to certain pattern points of the patterns. For example, if a pattern period of the printed film 7 is equally divided and marked, and the cutting line marks are used as the identifiers, cutting line marks within different pattern periods are disposed on the same equally-divided and marked position.

Figure 4:
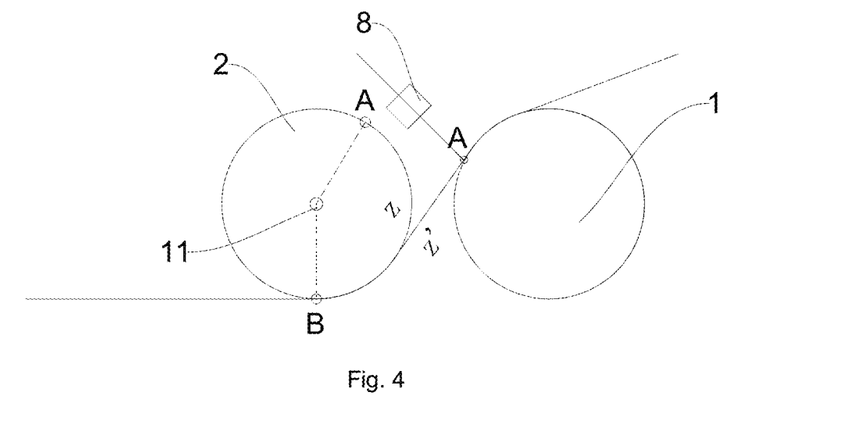
FIG. 4 is a working schematic diagram of the system for EIR, provided by the embodiment of the present application.

A working process of the system is described as follows in conjunction with FIG. 4.

In the working process of the system for EIR in the present embodiment, a starting point of a pattern period is defined as a zero point, the printed film 7 is laminated to the surface of the blank 10 by the film laminating roller 1, and the zero point of the printed film 7 corresponds to (is superimposed with) the zero point of the pattern roller 2. As shown in FIG. 4, with travelling of the blank 10, the camera 8 acquires an image of the printed film 7, which comprises a certain identifier on the surface, and the identifier information is transmitted to the control unit 123 by the data acquisition unit 122, and the control unit 123 acquires a pattern position A, corresponding to the identifier, of the printed film 7 according to the information stored by the storage unit 121; the encoder 11 acquires a rotation position (such as an angle or arc length rotating relative to the zero point) of the pattern roller 2 and transmits the information to the control unit 123 by virtue of the data acquisition unit 122; and the control unit 123 is capable of calculating an embossing position B of the pattern roller 2 and a distance z (representing the position information of the pattern roller 2) from the embossing position B to the pattern position A at the periphery of the pattern roller 2 at the moment according to the rotation position of the pattern roller 2 and the pattern information, stored by the storage unit 121, of the pattern roller 2, comparing the distance z with a distance z' (representing the position information of the identifier) from the position B to the pattern position A on the printed film 7, and adjusting a rotating speed of the pattern roller 2 according to a difference of z and z', so that the pattern A on the printed film 7 is superimposed with the pattern A at the periphery of the pattern roller 2 as much as possible when acting on the blank 10.

As an implementation way, if the cutting line marks are adopted as the identifiers, the storage unit 121 records the identifiers and the position information corresponding to the patterns within a pattern period. After an image of one of the identifiers is acquired, a position to which the printed film 7 moves and the pattern laminated to the blank 10 on the position at the moment may be judged. The storage unit 121 further stores the pattern information within the period of the pattern roller 2. Based on above, the position of the corresponding pattern may be acquired according to the rotation position of the pattern roller 2.

Specifically, at an initial stage of film lamination, the position of the camera 8 is recorded in the control unit 123; an initial rotation position of the pattern roller 2 is recorded by the encoder 11, and the position information is acquired and recorded in the control unit 123. When one of the identifiers moves to the position of the camera 8, the image of the printed film 7 is acquired to the control unit 123, and the control unit 123 is capable of identifying the corresponding pattern position (the pattern position A in FIG. 4) of the printed film 7 at the moment based on the identifier information included by the image of the printed film 7; and further, the control unit 123 calculates a difference of the position information (z in FIG. 4) of the pattern position A on the printed film 7 and the position information (z' in FIG. 4) of the pattern position A on the pattern roller 2 at the moment based on the pattern information, stored by the storage unit 121, within the period of the pattern roller 2 and the rotation position, detected by the encoder 11, of the pattern roller 2, and a malposition t difference may be adjusted by adjusting the rotating speed of the pattern roller 2 until the patterns of the printed film 7 correspond to the embossing textures of the pattern roller 2.

As an implementation way, various types of the identifiers may be adopted, the identifiers at least comprise a first identifier and a second identifier, the first identifier regularly corresponds to a first pattern position of the printed film 7 in a pattern period, and the second identifier regularly corresponds to a second pattern position of the printed film 7 in a pattern period. Specifically, for example, the cutting line mark may be adopted as the first identifier, the color card mark may be adopted as the second identifier, wherein in different pattern periods of the printed film 7, the cutting line marks correspond to the first pattern positions, and the color card marks correspond to the second pattern positions.

As above, the first pattern position and the second pattern position refer to positions of different patterns within a pattern period.

In the above-mentioned implementation way, the control unit 123 is further configured to generate a displacement change tendency signal based on a comparison result of a pattern position, corresponding to the first identifier, of the printed film 7 and a pattern position of the pattern roller 2 at a first moment (that is, a comparison result of z and z' at the first moment) and a comparison result of a pattern position, corresponding to the second identifier, of the printed film 7 and a pattern position of the pattern roller 2 at a second moment (that is, a comparison result of z and z' at the second moment), and adjust and generate the rotation control signal of the pattern roller 2 based on the change tendency signal, as shown in FIG. 7.

Specifically, at the first moment, data fed back to the control unit 123 is a difference value of the first pattern position, corresponding to the first identifier, of the printed film 7 and the position information of the pattern roller 2 at the moment, at the same time, the control system 12 has generated a rotation adjustment signal of the pattern roller 2 based on the difference value; and at the second moment, data fed back to the control unit 123 is a difference value of the second pattern position, corresponding to the second identifier, of the printed film 7 and the position information of the pattern roller 2 at the moment, and the difference value at the second moment is adjusted so as to embody an adjustment tendency which may be achieved by adopting the current control signal for the pattern roller 2, in other words, the difference values of position signals acquired at the two moments is capable of reflecting whether the adjustment solution is reasonable, and the control unit 123 is capable of adjusting the control signal with reference to such an adjustment tendency. For example, if the current control signal for the pattern roller 2 is reasonable, the difference value at the second moment will be reduced as comparison with the difference value at the first moment, thus the current adjustment solution may be further adopted; furthermore, the control signal for the pattern roller 2 may also be adjusted so that the difference value is adjusted from rapid reduction to relatively slow reduction to avoid over-adjustment; and if over-adjustment has happened at present, an opposite control signal is required to be adopted for adjustment. The solution is beneficial to the real-time adjustment of the adjustment solution of the pattern roller 2, so that a required adjustment solution may be achieved as soon as possible.

As an implementation way, the storage unit 121 is further configured to store the position information of the identifiers in a coordinate form, wherein the first identifier is defined as a basic identifier, the position of the first identifier is defined as an initial coordinate position, and the initial coordinate position is stored in the storage unit 121; position information of a second coordinate is set and stored based on a distance from the first identifier to the second identifier and is stored in the storage unit 121; accordingly, if there are other identifiers, position information of all the identifiers relative to the initial coordinate position is stored; and the positions of all the identifiers are stored by adopting the coordinate positions, which is beneficial to statistical calculations. The position of the printed film 7 may be identified based on the set position of the camera 8 and the coordinates of the identifiers identified according to the image of the printed film 7, and then, the pattern of the printed film 7 laminated to the position A of the blank may be concluded.

The control unit 123 is further configured to identify identifier information based on the image of the printed film 7 acquired by the camera 8, and call the position information corresponding to the identifier. Specifically, all the identifier may be further numbered according to a moving direction of the printed film 7, and corresponding information of the position and number of each identifier is stored in the storage unit 121. After an identifier is identified based on the image acquired by the camera 8, the number of the identifier is called, and thus, position corresponding to the identifier may be called.

For example, a cutting line mark, an arrow direction mark and a color card mark are sequentially set within a pattern period of the printed film 7, the cutting line mark is used as a basic identifier and is defined as a first identifier, and coordinates of the cutting line mark may be set as origin coordinates (0, 0); the arrow direction mark is spaced from the cutting line mark for 30 measurement units and is defined as a second identifier, and coordinates of the arrow direction mark are (0, 30); and the color card mark is spaced from the cutting line mark for 50 measurement units and is defined as a third identifier, and coordinates of the color card mark are (0, 50). After identifying the cutting line mark based on the image of the printed film 7, the control unit 123 calls the position of the printed film 7 to be compared with the position of the pattern roller 2.

In some embodiments of the present application, a circumference of the pattern roller 2 is 104%-115% of a circumference of a printing stencil; and the circumference of the printing stencil is a length corresponding to a repetition period of patterns of the printed film 7. Further, the circumference of the pattern roller 2 is preferably 106%-110% of the circumference of the printing stencil and is further preferred as 108% of the circumference of the printing stencil according to different types of textures and different embossing depths. Due to the adoption of such a solution in which a corresponding relationship between the expansion rate and the patterns of the printed film during processing is taken into consideration, the executability of EIR may be favorably guaranteed.

In other words, in the above-mentioned embodiment, the patterns at the periphery of the pattern roller 2 are formed after stretching by 104%-115% based on patterns of the printing stencil. It can be understood that the above-mentioned expansion rate is also taken into consideration in the above-mentioned process that z and z' are compared.

In some embodiments of the present application, as shown in FIG. 1, the system further comprises a deviation correcting device 9 disposed on the release path of the printed film 7. The deviation correcting device 9 adopts an automatic deviation corrector to avoid release deviation of the printed film 7.

Another embodiment of the present application provides a control method for EIR, by which patterns of a printed film 7 are superimposed with embossing textures as much as possible by virtue of the above-mentioned system for EIR.

Figure 5:
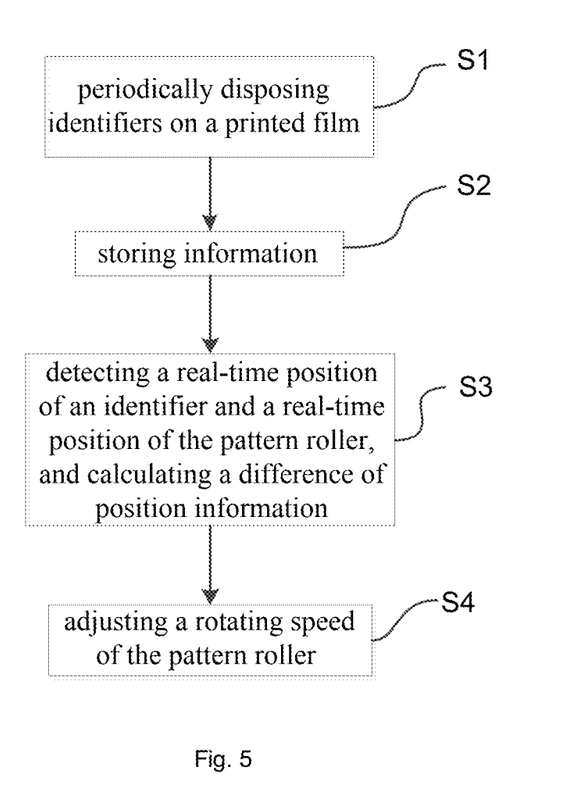
FIG. 5 is a first flow diagram of a control method for EIR, provided by an embodiment of the present application.

As shown in FIG. 5, the control method for EIR comprises:

S1: identifiers are periodically disposed on a printed film 7.

The identifiers are initially processed on the printed film 7, that is, the identifiers are originally presented on the printed film 7, but are not specially processed for EIR, for example, the identifiers may be graphic information such as a cutting line mark, a cross-shaped center-of-circle mark, an arrow direction mark, a color card mark and an enterprise logo; each identifier periodically corresponds to the same pattern position of the printed film 7; and specifically, the same identifiers are disposed on the same pattern positions in different pattern periods of the printed film 7.

S2: corresponding information of the identifiers and pattern positions of the printed film 7 as well as pattern information at a periphery of a pattern roller are stored.

S3: a real-time position of an identifier and a real-time position of the pattern roller are detected, and a difference of position information of the identifier and position information of the pattern roller 2 at the same moment is calculated.

It can be understood that patterns of the printed film 7 correspond to patterns of the pattern roller 2, thus herein, the position information of the pattern roller 2 refers to a position of a pattern, corresponding to the identifier, on the pattern roller 2, and the difference of the position information refers to the difference of z and z' as described above.

S4: a rotating speed of the pattern roller 2 is adjusted to reduce the difference of the position information.

Further, as an implementation way, the identifiers at least comprise a first identifier and a second identifier, the first identifier regularly corresponds to a first pattern position of the printed film 7, and the second identifier regularly corresponds to a second pattern position of the printed film 7.

Figure 6:
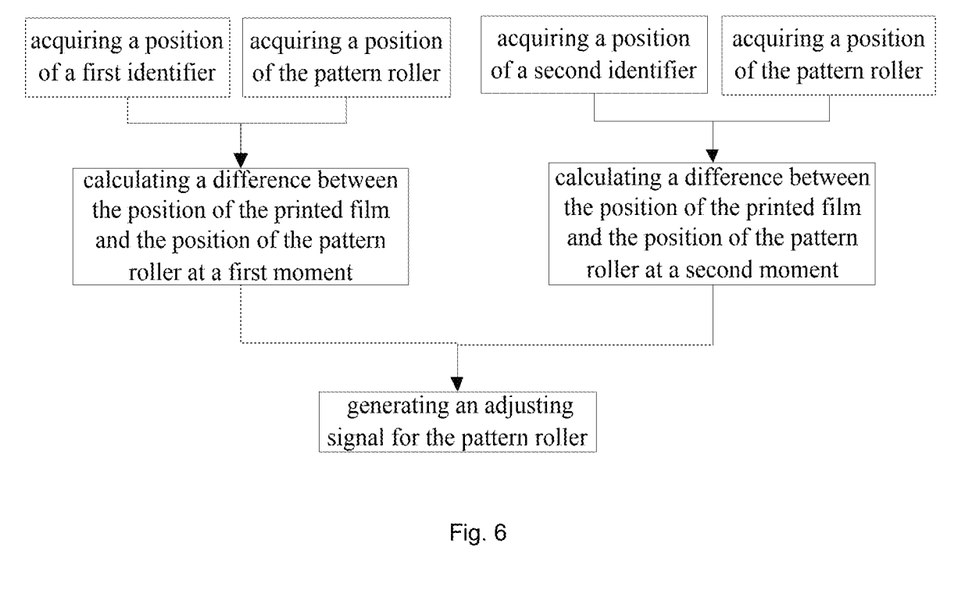

Accordingly, as shown in FIG. 6, the control method further comprises:

a first deviation value, that is, a difference value of z and z' at a first moment, is acquired based on a real-time position of the first identifier and a real-time position of the pattern roller;

a second deviation value, that is, a difference value of z and z' at a second moment, is acquired based on a real-time position of the second identifier and a real-time position of the pattern roller;

the second deviation value is compared with the first deviation value to acquire a synchronous adjustment tendency; and whether the adjustment solution is reasonable is judged based on the synchronous adjustment tendency, and then the rotating speed of the pattern roller is adjusted.

Specifically, if the second deviation value at the second moment is smaller than the first deviation value at the first moment, it is proven that a position difference of embossing textures and the patterns of the printed film 7 may be reduced by using the current adjustment solution, so that the current adjustment solution may be further executed, or furthermore, the control signal for the pattern roller 2 may also be adjusted to change the deviation from rapid reduction to relatively slow reduction, so as to avoid over-adjustment.

If the second deviation value at the second moment is greater than the first deviation value at the first moment, it is proven that over-adjustment has happened at present, and an opposite control signal is required to be adopted for adjustment.

The above-mentioned solution is beneficial to the real-time adjustment of the adjustment solution of the pattern roller 2, so that a required adjustment solution may be achieved as soon as possible.

As an implementation way of step S3, positions of the identifiers are acquired by adopting the following method. The control method further comprises:

coordinates of the first identifier are defined, and coordinates of the second identifier are set based on the coordinates of the first identifier and a position relationship between the first identifier and the second identifier;

after an identifier is identified, the coordinates of the identifier are called; and the position of the identifier is confirmed based on the coordinates of the identifier.

By using the EIR solution provided by the present application, the printed film is not required to be widened and additionally processed with the identifiers, and an existing structure and effective area of the printed film are effectively used, so that the outturn percentage may be guaranteed, and the production cost cay be reduced.

The above descriptions are merely the preferred embodiments of the present application, but are not intended to limit the present application. Any modifications, equivalent replacements, improvements and the like made within the spirit and principle of the present application shall fall within the protective scope of the present application.

The invention claimed is:

1. A system for embossed-in-register of a sheet, comprising a printed film winding/releasing mechanism for winding/releasing a printed film, a film laminating roller for assistance in lamination of the printed film and a pattern roller spaced from the film laminating roller, wherein the printed film is periodically provided with identifiers at intervals on positions corresponding to pattern positions of the printed film; the system further comprises:

a camera, disposed on a release path of the printed film and configured to acquire an image of the printed film;

an encoder, disposed on the pattern roller and configured to detect a rotation position of the pattern roller; and a control system comprising:

a storage unit, configured to store corresponding information of the identifiers and the pattern positions of the printed film as well as pattern information at a periphery of the pattern roller;

a data acquisition unit, configured to acquire an image signal, acquired by the camera, of the printed film and a position signal, detected by the encoder, of the pattern roller; and a control unit, configured to acquire data from the data acquisition unit, identify a position of an identifier based on the image of the printed film, identify the rotation position of the pattern roller based on information fed back by the encoder and generate a rotation control signal of the pattern roller based on a difference of position information of the identifier and position information of the pattern roller at the same moment so as to adjust a rotation speed of the pattern roller;

wherein, the identifiers at least comprise a first identifier and a second identifier, the first identifier regularly corresponds to a first pattern position of the printed film, and the second identifier regularly corresponds to a second pattern position of the printed film;

wherein, the control unit is further configured to generate a displacement change tendency signal based on a comparison result of a pattern position, corresponding to the first identifier, of the printed film and a pattern position of the pattern roller at a first moment and a comparison result of a pattern position, corresponding to the second identifier, of the printed film and a pattern position of the pattern roller at a second moment, and adjust and generate the rotation control signal of the pattern roller based on the change tendency signal;

wherein, the storage unit is further configured to define a coordinate position of the first identifier and store the coordinate position of the first identifier, set position information of a second coordinate based on a distance from the first identifier to the second identifier and store a coordinate position of the second identifier; and the control unit is further configured to identify the identifier based on the image, acquired by the camera, of the printed film, and call coordinate information corresponding to the identifier to acquire position information of the printed film.

2. The system according to claim 1, wherein, a circumference of the pattern roller is 104%-115% of a circumference of a printing stencil; and the circumference of the printing stencil is a length corresponding to a repetition period of patterns of the printed film.

3. The system according to claim 1, wherein, the identifiers are originally presented on the printed film and are not post-processed for embossed-in-register, and the identifiers comprise, but not limited to a cutting line mark, a center-of-circle mark, a direction mark and a color card mark.

4. The system according to claim 1, wherein, the system further comprises a deviation correcting device disposed on the release path of the printed film.

5. A control method for embossed-in-register, using the system for embossed-in-register according to claim 1, comprising:

periodically disposing identifiers on a printed film;

storing corresponding information of the identifiers and pattern positions of the printed film as well as pattern information at a periphery of a pattern roller;

detecting a real-time position of an identifier and a real-time position of the pattern roller, and calculating a difference of position information of the identifier and position information of the pattern roller at the same moment; and adjusting a rotating speed of the pattern roller to reduce the difference of the position information;

wherein, the identifiers at least comprise a first identifier and a second identifier, the first identifier regularly corresponds to a first pattern position of the printed film, and the second identifier regularly corresponds to a second pattern position of the printed film;

the control method further comprises:

acquiring a first deviation value based on a real-time position of the first identifier and a real-time position of the pattern roller;

acquiring a second deviation value based on a real-time position of the second identifier and a real-time position of the pattern roller;

comparing the second deviation value with the first deviation value to acquire a synchronous adjustment tendency; and judging whether an adjustment solution is reasonable based on the synchronous adjustment tendency, and adjusting a rotating speed of the pattern roller.

6. The control method according to claim 5, wherein, further comprises:

if the second deviation value is smaller than the first deviation value, further adopting the current adjustment solution, or adjusting a control signal for the pattern roller to change the deviation from rapid reduction to relatively slow reduction, so as to avoid over-adjustment; and if the second deviation value is greater than the first deviation value, proving that over-adjustment has happened at present, and adopting an opposite control signal for adjustment.

7. The control method according to claim 5, wherein, further comprises:

defining coordinates of the first identifier, and setting coordinates of the second identifier based on the coordinates of the first identifier;

after identifying an identifier, calling the coordinates of the identifier; and confirming a position of the identifier based on the coordinates of the identifier.

* * * * *